United States Patent [19]
Niimi et al.
[11] 3,730,982
[45] May 1, 1973

[54] BURST LEVEL DETECTORS AND PHASE DETECTORS UTILIZING THE SAME

[75] Inventors: Masayasu Niimi, Kodaira-shi, Tokyo; Katsuo Mouri, Totsuka-ku, Yokohama-shi, Kanagawa-ken, both of Japan

[73] Assignee: Hitachi, Ltd., Tokyo, Japan

[22] Filed: Dec. 27, 1971

[21] Appl. No.: 212,183

[30] Foreign Application Priority Data

Dec. 28, 1970 Japan ....................45/120454
Apr. 16, 1971 Japan ....................46/23865

[52] U.S. Cl......178/5.4 CK, 178/5.4 AC, 178/5.4 SY
[51] Int. Cl.....................H04n 9/48
[58] Field of Search....................178/5.4 CK, 5.4 AC, 178/5.4 SY

[56] References Cited

UNITED STATES PATENTS 3,586,765 6/1971 Jirka ....................178/5.4 CK
3,626,089 12/1971 Cecchin ....................178/5.4 AC

*Primary Examiner*—Robert L. Richardson
*Attorney*—Craig, Antonelli & Hill

[57] ABSTRACT

A burst level detector for use in a color television receiver comprises a balanced type differential amplifier stage including a pair of transistors, a pair of load resistors respectively connected to the transistors, means to impress a burst signal voltage upon the input terminal of the differential amplifier stage and means to derive an output signal from the differential amplifier, characterized in that the load resistors have different resistance values to establish a point at which the polarity of the differential output from the differential amplifier stage reverses. The burst level detector can be converted into a phase detector by connecting a series circuit including a resistor and a capacitor across the load resistors.

18 Claims, 10 Drawing Figures

INVENTORS

MASAYASU NIIMI,

KATSUO MOURI

BY Craig, Antonelli & Hill
ATTORNEYS

INVENTORS
MASAYASU NIIMI,
KATSUO MOURI

BY Craig, Antonelli & Hill
ATTORNEYS

INVENTORS
MASAYASU NIIMI, KATSUO MOURI
BY
Craig, Antonelli & Hill
ATTORNEYS

INVENTORS
MASAYASU NIIMI, KATSUO MOURI
BY
Craig, Antonelli & Hill
ATTORNEYS

INVENTORS
MASAYASU NIIMI, KATSUO MOURI
BY
Craig, Antonelli & Hill
ATTORNEYS

BURST LEVEL DETECTORS AND PHASE DETECTORS UTILIZING THE SAME

BACKGROUND OF THE INVENTION

This invention relates to an improved burst level detector suitable for use as a color killer signal generating circuit or an automatic chrominance control circuit (ACC). The invention also relates to a phase detector for automatic phase control of a color television receiving circuit.

When receiving a white and black video signal with a color television receiver, a color killer circuit (or a color eliminator) is used for the purpose of interrupting the color signal circuit so as to eliminate colored grid shaped spots (noise) caused by the color signal circuit from the reproduced white and black picture. Further, in order to prevent the chrominance of the picture from being changed by the variation in the level of the carrier color signal which occurs when the receiving channel is switched from one channel to another it is usual practice to use an automatic chrominance control (ACC) as an automatic gain control (AGC) of a color signal amplifier. It is necessary to detect the color burst signal (for the sake of brevity, hereinafter merely termed a burst signal) contained in the video signal for the purpose driving such a color killer circuit or ACC.

FIG. 1 shows a block connection diagram of a portion of a color television receiver in which a color killer circuit or an ACC is used. In this figure, a color signal detected by a detector (not shown) is amplified by first and second band amplifiers connected in cascade and the amplified output from the second stage is supplied to a color signal demodulator, not shown. A portion of the output from the first band amplifier is also applied to a burst level detector which detects the burst signal in the color signal. In this example, the burst level detector comprises a burst level detector for the color killer and a burst level detector for the automatic chrominance control and the outputs thereof are applied to the first and second amplifier stages, respectively, as diagrammatically shown, for controlling the color killer circuit and the automatic chrominance control circuit. The use of the output of the burst level detector for controlling the color killer circuit and ACC is well known in the art. According to a prior art method of controlling the color killer by the output from the burst level detector, the output is compared with a reference voltage for determining the presence or absence of the burst signal. In this method, the second band amplifier is operated only when the burst signal precents. To this end, it is necessary to use a circuit for producing the reference voltage which acts as the threshold value and a comparator for comparing the output signal with the reference voltage, thus complicating the circuit construction. Moreover, the reference voltage is susceptible to the variation in the source voltage thus causing instability of the operation.

SUMMARY OF THE INVENTION

Accordingly, it is an object of this invention to provide a new and improved burst level detector for use in a color television receiver of simple circuit construction which does require an independent source of reference voltage.

Another object of this invention is to provide an improved burst level detector which is not susceptible to variations in the source voltage.

Still another object of this invention is to provide a novel burst level detector which can be readily fabricated as an integrated circuit on a semiconductor substrate.

A further object of this invention is to provide a burst level detector which can be readily converted into a phase detector by adding simple circuit elements and to provide such a phase detector for use in color television receiver which does not produce color mismatch in the reproduced picture under weak field condition.

In accordance with one aspect of this invention, there is provided a burst level detector for use in a color television receiver comprising a balanced type differential amplifier stage including a pair of transistors, a pair of load resistors respectively connected to the transistors, means to impress a burst signal voltage upon the input terminal of the differential amplifier stage, and means to derive an output signal from the differential amplifier stage characterized in that the load resistors have different resistance values to establish a point at which the polarity of the differential output from the differential amplifier stage reverses.

In accordance with another aspect of this invention there is provided a phase detector for use in a color television receiver, comprising a balanced type differential amplifier stage including a pair of transistors, a pair of load resistors respectively connected to the transistors, means to impress a horizontal synchronizing pulse to the input terminal of the differential amplifier stage, means to derive an output signal from the differential amplifier stage and a series circuit connected between the pair of resistors, the series circuit including a resistor and a capacitor, characterized in that the load resistors have different resistance value to establish a point at which the polarity of the differential output from the differential amplifier stage reverses.

In accordance still another feature of the invention there is provided a phase detector for use in a color television receiver comprising a differential amplifier stage including a pair of amplifier elements, a source of constant current connected to corresponding electrodes of the amplifier elements, a first source of bias voltage, first diode means connected between the output terminal of the differential amplifier stage and the first source of bias voltage for setting the upper limit of the output voltage of the differential amplifier stage, a second source of bias voltage, second diode means connected between the output terminal of the differential amplifier stage and the second source of bias voltage for setting the lower limit of the output voltage of the differential amplifier stage, means for controlling the operation of the source of constant current in accordance with a burst pulse and a signal selected from the group consisting of a chromaticity signal and the AC component of a local color sub-carrier wave signal for causing the source of constant current to operate only during a predetermined period, and means for applying to the differential amplifier stage an input signal selected from the group consisting of the local color sub-carrier wave signal and the chromaticity signal thereby producing at the output terminal of the differential amplifier stage an output signal corresponding to the phase difference between the burst signal and the local color sub-carrier wave signal.

DESCRIPTION OF THE PREFERRED EMBODIMENTS

Figure 1:
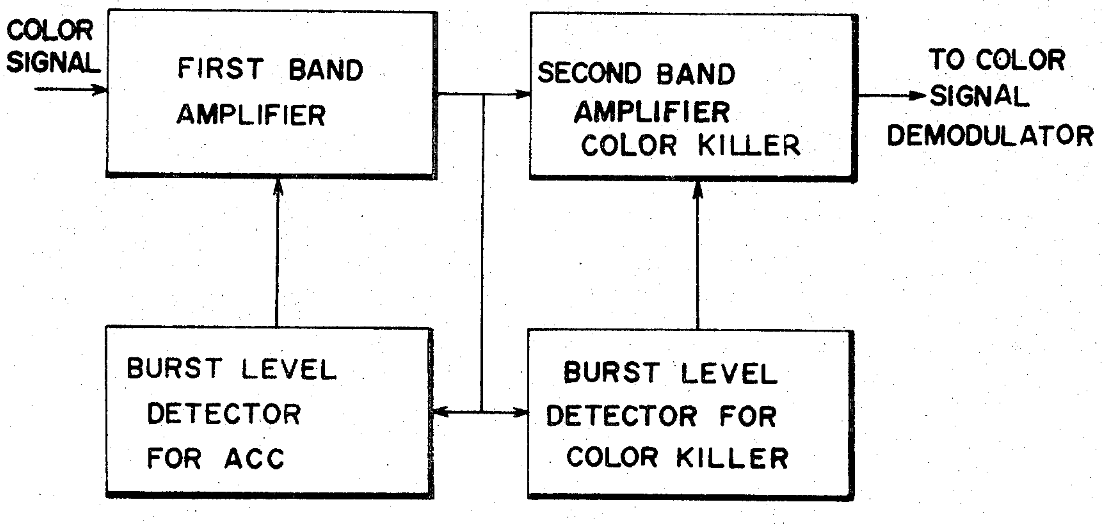
FIG. 1 is a block diagram of a portion of a color television receiver showing the connection of the novel burst level detector with a color killer and an automatic chrominance control circuit.
Figure 2:
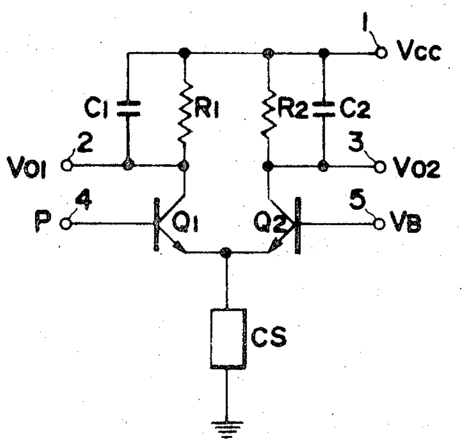
FIG. 2 is a connection diagram of the basic form of the circuit embodying the invention.

FIG. 2 shows a connection diagram of the basic form of the burst level detector embodying the invention. The detector shown therein comprises first and second transistors Q1 and Q2 with their emitter electrodes connected together directly, thus forming a half-balance type differential amplifier stage. The collector electrode of transistor Q1 is connected to a source terminal 1 via a first load resistor R1 and a first capacitor C1 which are connected in parallel. In the same manner, the collector electrode of transistor Q2 is connected to the same source terminal 1 through a parallel-connected second load resistor R2 and a second capacitor C2. Further, the collector electrodes of transistors Q1 and Q2 are connected to output terminals 2 and 3, respectively, from which a differential output is derived for application to the circuit to be controlled directly or via a differential amplifier in the next stage. Load resistors R1 and R2 have different resistance values, at a ratio of 1 to 1.04 or more. The base electrodes of transistors Q1 and Q2 are biased by the same DC voltage through terminals 4 and 5, respectively. Further, the burst voltage is superimposed upon the DC bias voltage applied to transistor Q1.

Figure 4:
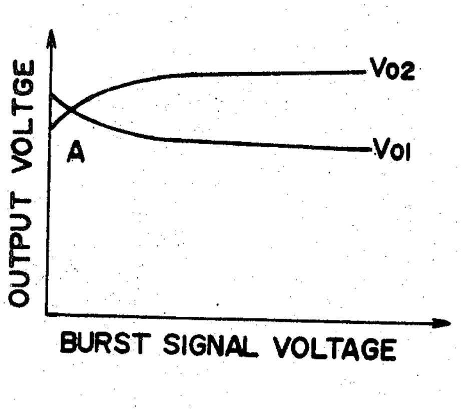
FIG. 4 is a graph showing the input burst signal voltage vs. output voltage characteristics of the circuit shown in FIG. 2.
Figure 5:
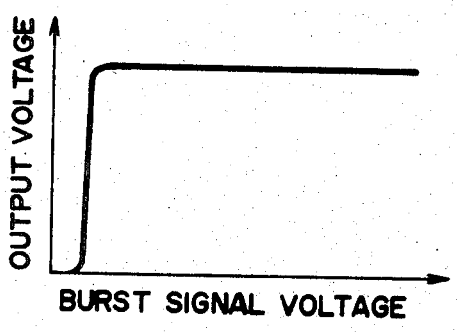
FIG. 5 is a graph showing the input burst signal voltage vs. output voltage when the circuit of this invention is used to control a color killer circuit.

The theory and operation of the circuit described above is as follows: FIG. 4 is a graph showing the input vs. output voltage characteristics of the circuit shown in FIG. 2. In the absence of the burst signal equal collector currents flow through transistors Q1 and Q2. For this reason, if R1 R2, the output voltages Vo1 and Vo2 of transistors Q1 and Q2 will have a relation Vo1 Vo2. As the burst signal increases gradually, the output voltage of transistor Q1 decreases gradually, whereas voltage Vo2 of transistor V2 increases gradually, as shown in FIG. 4. At a certain value of the burst level, a condition Vo1 = Vo2, is reached as at a point A. As the burst signal increases beyond this level the relative value of Vo1 and Vo2 becomes Vo1 Vo2. In this manner, the output voltage of the burst detector varies above and below point A, and the polarity of the differential output voltage (Vo1 − Vo2) is reversed at point A. When this differential output is applied to a second differential amplifier, the output thereof jumps at point A as shown in FIG. 5. Point A can be varied at will by varying the ratio between the transistor load resistors R1 and R2. If one uses the level of the burst signal at point A as the threshold value for determining the presence or absence of the signal, it would be possible to use the output from the second amplifier stage as the color killer control signal. We have found that it is possible to obtain desired characteristics when the ratio between transistor load resistors is set to be 1:1.04 or more.

Figure 3:
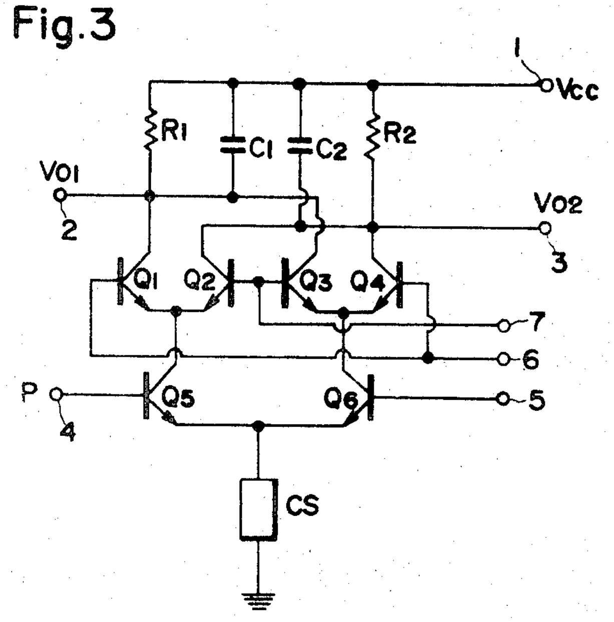
FIG. 3 is a connection diagram of a modified embodiment of this invention.

FIG. 3 shows an example of a burst level detector utilizing full balance type differential amplifier stages. There are provided three pairs of transistors Q1, Q2, Q3, Q4 and Q5, Q6. The emitter electrodes to each pair are connected together. The emitter electrodes of transistors Q1 and Q2 which are connected together are connected to the collector electrode of transistor Q5, while the emitter electrodes of transistors Q3 and Q4 which are also connected together are connected to the collector electrode of transistor Q6. The collector electrodes of transistors Q1 and Q3 are connected together and are connected to source terminal 1 via a parallel combination of load resistor R1 and capacitor C1. In the same manner, the collector electrodes of transistors Q2 and Q4 are connected together and are connected to the source terminal 1 through a parallel combination of load resistor R2 and capacitor C2. Commonly connected collector electrodes of transistors Q1 and Q3 are connected to output terminal 2 and the commonly connected collector electrodes of transistors Q2 and Q4 are connected to output terminal 3. A DC voltage is applied to the base electrodes of transistors Q2 and Q3 through terminal 7 and a reference signal is applied to the base electrodes of transistors Q1 and Q4 through terminal 6. DC bias voltages are applied to the base electrodes of transistors Q5 and Q6 through terminals 4 and 5, respectively. The burst signal is superimposed upon the DC bias voltage impressed upon the base electrode of transistor Q5. The commonly connected emitter electrodes of transistors Q5 and Q6 are connected to one terminal of a source of constant current CS. Although the illustrated full balance type burst level detector operates in the same manner as the half balance type burst level detector described above, because of the full balance type, it is possible to decrease the effect of the variation in the source voltage which supplies the DC bias voltages.

The circuit embodying the invention is suitable to be fabricated on a silicon substrate by utilizing semiconductor integrated circuit techniques. With this technique, since it is possible to form transistor pairs for the differential amplifier at extremely close positions on the same silicon substrate under the same condition of fabrication so that it is possible to readily obtain transistors having the same electrical characteristics such as the current amplification coefficient. Pairs of load resistors having different values for differential amplifier stages can be readily prepared by using different masks.

Figure 6:
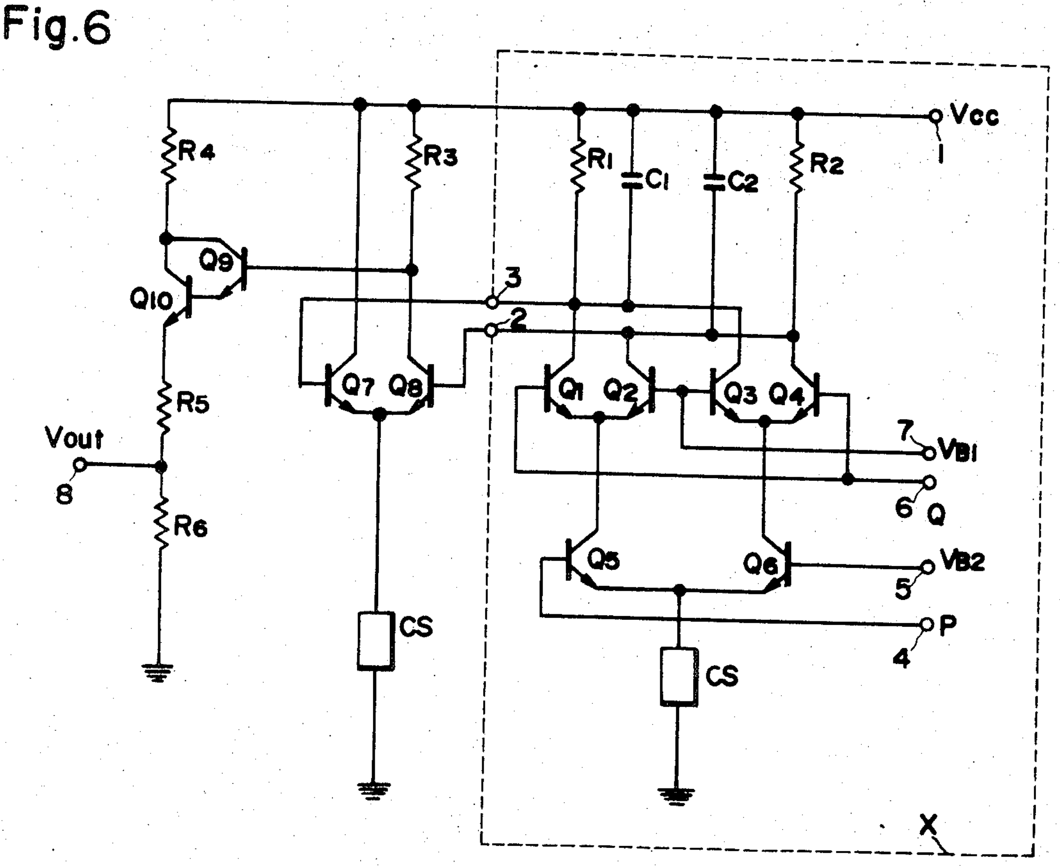
FIG. 6 shows the application of the circuit shown in FIG. 3 to the control of a color killer circuit.

FIG. 6 shows a connection diagram of the full balance type burst level detector shown in FIG. 3 applied as a color killer circuit. In FIG. 6, elements bounded by the dotted line rectangle X represent the burst level detector of this invention. Transistors Q7 and Q8 constitute a second differential amplifier stage with their emitter electrodes connected to a source of constant current CS. Output terminals 2 and 3 of the burst level detector comprising transistors Q1 to Q6 inclusive are connected to the respective base electrodes of transistors Q7 and Q8 of the second differential amplifier stage, the output thereof being coupled to the base electrode of a transistor Q9 connected in the Darlington fashion with transistor Q10. The emitter electrode of transistor Q10 is grounded through serially connected resistors R5 and R6 and the junction between them is connected to an output terminal 8 for producing a color killer signal.

In the absence of the burst signal, the outputs Vo1 and Vo2 of the burst level detector of terminals 2 and 3, respectively, have relative values expressed by a relation Vo1 Vo2 and these outputs are applied to the second differential amplifier stage as the differential inputs. Accordingly, transistor Q7 is rendered ON, whereas transistor Q8 is maintained OFF. As the level of the burst signal increases beyond point A in FIG. 4, transistor Q9 is quickly turned ON to rapidly decrease the output of the second stage differential amplifier stage due to the voltage drop across load resistor R3. Accordingly, the output of the amplifier stage constituted by transistors Q9 and Q10 of the Darlington connection increases very rapidly as shown by the characteristic curve of FIG. 5. This stepped output can be directly applied to the color killer circuit for interrupting the color signal circuit.

According to this invention, there is provided a novel burst level detector wherein a pair of load resistors having different values are used for establishing a point A at which the polarity of the differential output is reversed thus providing a threshold value which can be used as the threshold value for determining the presence or absence of the burst signal. As above described, the position of point A can be readily determined by the relative values of load resistors R1 and R2 of the burst level detector.

Thus, the novel burst level detector does not require to use a reference voltage for generating the killer signal, thus providing a simple color killer circuit which does not require a reference voltage generator. Further, the reference voltage produced by prior art circuits is susceptible to the effect of ripple caused by variations in the source voltage, thus causing such unstable operations as variations in the threshold voltage, generation of unwanted color killer signals, or failure of the generation of the wanted color killer signal. On the contrary, in the novel burst level detector of the present invention since the threshold value which is used as the reference for generating the color killer signal is determined by the ratio of the load resistors, there is an advantage that the threshold value is not affected by the ripple caused by the variation in the source voltage. Moreover, since all circuit elements constituting the novel burst level detector are directly connected, it is quite easy to fabricate the burst level detector as an integrated circuit.

Figure 7:
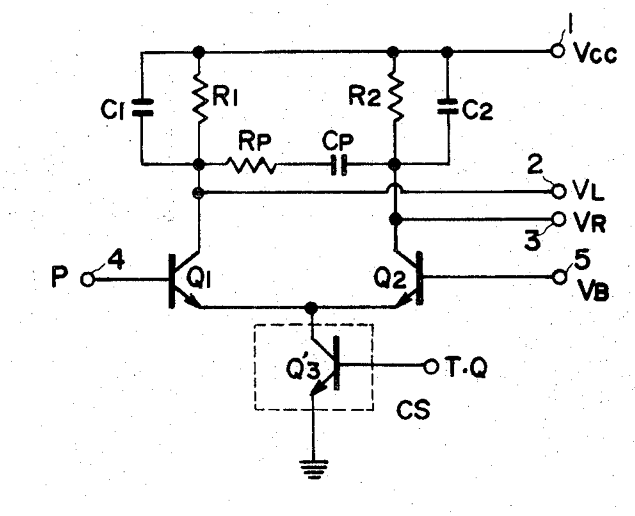
FIG. 7 shows a modification of the circuit shown in FIG. 2 for use as a phase detector.

FIG. 7 shows a modification of the circuit shown in FIG. 2 suitable for use as a phase detector in a color synchronizing circuit of a color television receiver. In this modification a series circuit, including a resistor Rp and a capacitor Cp, is connected across output terminals 2 and 3 and the source of constant current is shown as comprising a transistor Q'3. A delayed horizontal synchronizing pulse P is applied to the base electrode of transistor Q1 as the tugger pulse.

Figure 8:
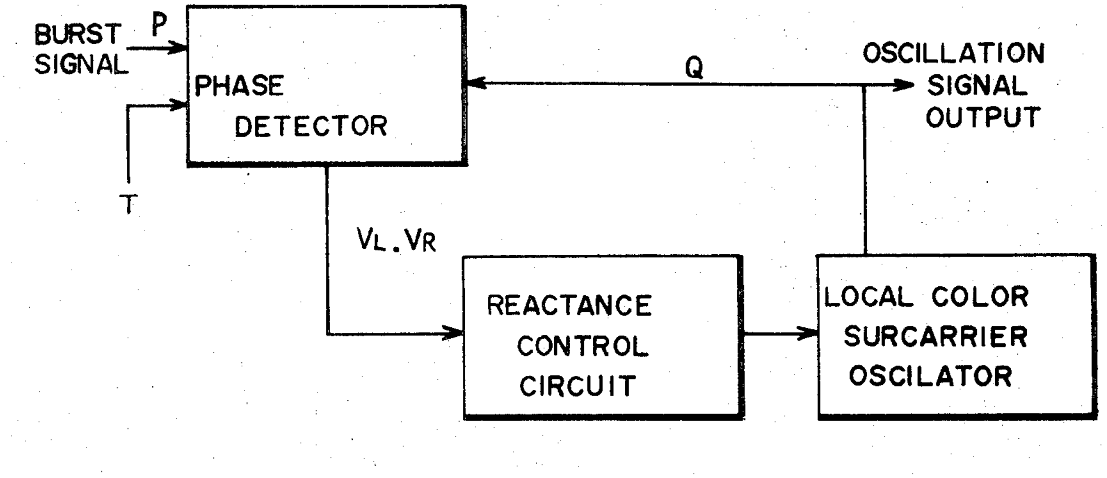
FIG. 8 is a block diagram showing the application of the novel phase detector for the automatic phase control of a color television receiver.

In order to reproduce a color picture it is necessary to reproduce three color difference signals from a carrier chromaticity signal by using a reference color subcarrier wave synchronized with the carrier chromaticity signal. As is well known to one skilled in the art, an automatic phase control circuit (APC) is used to produce the reference color sub-carrier wave in most cases. As diagrammatically shown in FIG. 8, a local color sub-carrier wave signal Q (having a frequency of 3.58 MHz, for example) generated by a local color subcarrier oscillator and a chromaticity signal or a burst signal P transmitted from a band amplifier, not shown, are applied to a phase detector to produce control signals VL and VR representing the instantaneous phase difference between the local color sub-carrier wave signal Q and the burst signal P. These control signals are applied to a reactance control circuit to be fed back to the local color sub-carrier oscillator thereby controlling the oscillation frequency thereof to a predetermined value and to synchronize the phase of the output signal Q with the burst signal.

Although the circuit shown in FIG. 6 is suitable for this purpose, where the antenna input is small under a weak field the level of the gate pulse is not sufficiently large thus decreasing the current flowing through constant current source Cs, thereby resulting in an excessive rise in the output voltages VL and VR. Further, when a large noise is contained in the antenna input signal the gate pulse shaping circuit (not shown) missoperates to apply a pulse T of large width to the phase detector. This causes large currents to flow through load resistors R1 and R2 thus decreasing the output voltages. Under these conditions, the reactance control circuit becomes inoperative thus stopping the oscillation of the local color sub-carrier oscillator. Also, even when the antenna input has a normal level, where a delayed horizontal synchronizing pulse alone is used as the gate pulse, inasmuch as a vertical synchronizing pulse having a large width is impressed, in addition to the horizontal synchronizing pulse, the output voltages VL and VR decrease too much during the vertical synchronization period whereby the oscillation of the local color sub-carrier oscillator is stopped during this period. For this reason, the oscillator stops oscillation each time a vertical synchronizing pulse is applied, thus producing colored spots in the reproduced picture caused by the vertical synchronizing pulse.

Another feature of this invention is to provide an improved phase detector for a color television color synchronizing circuit which does not produce color mismatch caused by the stopping of the oscillation under a weak field condition even when a delayed horizontal synchronizing pulse is used as the gate pulse.

Still a further feature of this invention is to attain the same object by utilizing a pulse containing both horizontal and vertical synchronizing pulses as the gate pulse.

Figure 9:
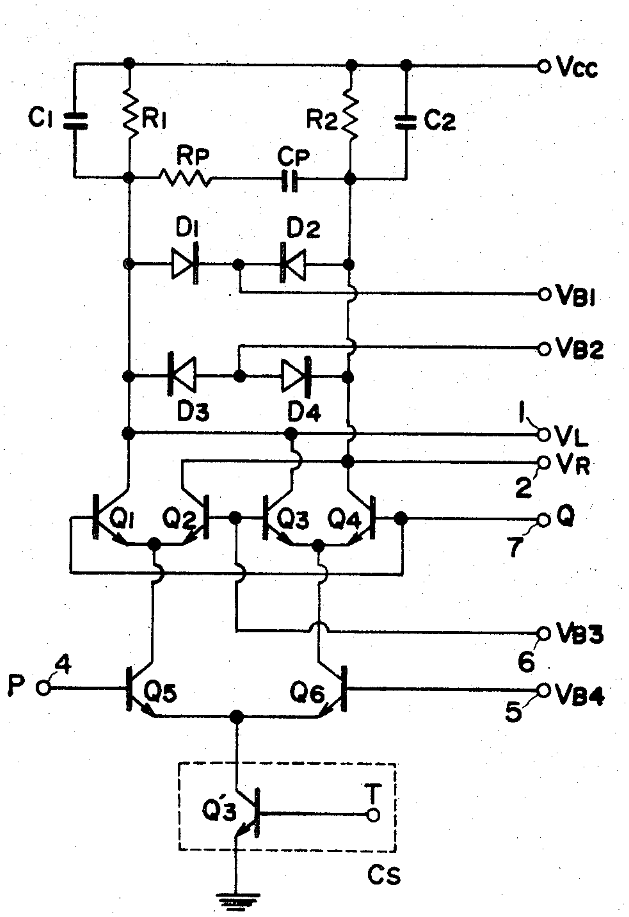
FIG. 9 is a connection diagram showing a full balance type phase detector using two differential amplifier stages and FIG. 10 is a connection diagram of a half balance type phase detector using one differential amplifier stage.

FIG. 9 shows such an improved phase detector circuit generally corresponding to the circuit shown in FIG. 3. Accordingly, the same or corresponding circuit elements are designated by the same reference characters. The source of constant current Cs is constituted by a transistor Q'3 which passes a constant current only when a gate pulse T such as a horizontal synchronizing pulse is impressed upon its input electrode, for example, the base electrode. The commonly connected collector electrodes of transistors Q1 and Q3 and the commonly connected collector electrodes of transistors Q2 and Q4 are interconnected by a pair of branches including diodes D1 and D2 and diodes D3 and D4, respectively, poled as shown. The junction between the cathode electrodes of diodes D1 and D2 is connected to a first source of bias voltage VB1, whereas the junction between the anode electrodes of diodes D3 and D4 is connected to a second source of bias voltage VB2. The polarities of the diodes are selected to set the upper and lower limits of the output voltage. A chromaticity signal or a burst signal P superimposed upon the bias voltage is applied to the base electrode of transistor Q5 which constitutes a differential amplifier stage together with transistor Q6. Further, the local color sub-carrier signal Q is applied across the base electrodes of transistors Q1 and Q4 and the base electrodes of transistors Q2 and Q3 together with a bias voltage VB3. Across output terminals 1 and 2, respectively, connected to the collector electrodes of transistors Q1 and Q4, are produced the output voltages VL and VR which are used to control the reactance control circuit shown in FIG. 5. The magnitude of the first bias voltage VB1 is selected to set the upper limit of the control voltage of a range capable of controlling the reactance control circuit, whereas the magnitude of the second bias voltage VB2 is selected to set the lower limit of the reactance control voltage.

The operation of the circuit shown in FIG. 9 is as follows: As above described, the transistor Q'3 of the source of constant current Cs is supplied with a gate pulse signal and conducts only during the period of the gate pulse (that is during a period of the chromaticity signal in which the burst signal P resents). Consequently, the phase detector constituted by transistors Q1 to Q6 inclusive compares the phases of the burst signal P with the local color sub-carrier wave signal Q, thus producing control outputs voltages VL and VR on the collector electrodes of transistors Q1 and Q4. Denoting the threshold voltage of diodes D1 to D4 by VB, the upper limit of the output voltage is limited to VB1 + VB and the lower limit to VB2 − VB.

This improved circuit prevents the local color subcarrier wave oscillator from stopping oscillation under the weak field condition. Under the normal field condition, even when the vertical synchronizing pulse causes an excessive current, thus tending to decrease the output voltage of the phase detector, the diodes D3 and D4 function to limit the lower value, thus preventing the stopping of the oscillation. This prevents colored spots from appearing in the reproduced picture. In addition, it is not necessary to provide a special circuit for producing the burst signal. This greatly simplifies the circuit construction of the color television receiver. In this embodiment, it is possible to apply the local color sub-carrier wave signal Q to the differential amplifier stage comprising transistors Q5 and Q6 and to apply the chromaticity signal P (including the burst signal) across the base electrodes of transistors Q1 and Q4 and the base electrodes of the transistors Q2 and Q3 for attaining the same object. It is also evident that NPN - type transistors shown in this example can be substituted by PNP - type transistors and that these bipolar type transistors can be substituted by field effect transistors.

The phase detector shown in FIG. 9 is the full balance type comprised by two differential amplifier stages respectively including transistors Q1, Q2, and transistors Q3 and Q4, but from the foregoing description regarding FIG. 2 it will be clear that the phase detector of this invention can also be fabricated as the semi-balance type utilizing only one differential amplifier stage.

Instead of applying a chromaticity signal as the input signal across the base electrodes of transistors Q1 and Q4 and the base electrodes of transistors Q2 and Q3 it is also possible to use only the burst signal instead of the chromaticity signal. In the latter case, the constant current source may constantly pass the constant current instead of only during the gate period.

Figure 10:
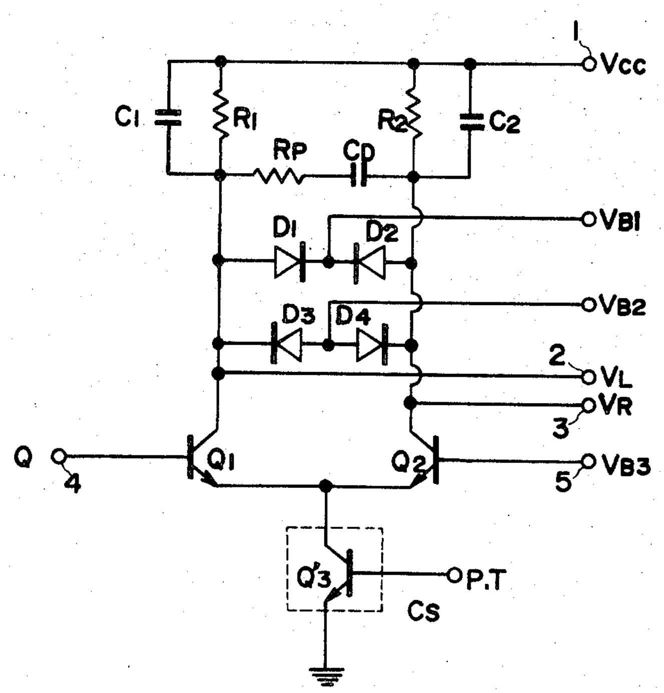

The embodiment shown in FIG. 10 utilizes a simplified circuit construction similar to that shown in FIG. 2. Again the same or corresponding circuit elements are designated by the same reference characters. In this embodiment, transistor Q'3 constituting the source of constant current Cs is rendered conductive only when it receives at its base electrode a gate pulse and the AC component P of a chromaticity signal or a burst signal to produce a constant current. A local color sub-carrier wave signal Q superposed on the bias voltage VB3 is applied a an input signal to the differential amplifier stage constituted by transistors Q1 and Q2. The same result can be obtained by exchanging the chromaticity signal P and the local color subcarrier wave signal Q. This embodiment can decrease the number of transistors, thus simplifying the circuit construction. Like the embodiment shown in FIG. 9, the upper and lower limits of the output voltages VL and VR are limited by diodes D1 to D4 inclusive and the first and second bias voltages VB1 and VB2.

Although the invention has been shown and described in terms of preferred embodiments, it should be understood that many changes and modifications may be made without departing from the true spirit and scope of the invention as defined in the appended claims.

What we claim is:

1. A burst level detector for use in a color television receiver comprising:

a balanced type differential amplifier stage including a pair of transistors;

a pair of load resistors respectively connected to said transistors;

means to impress a burst signal voltage upon the input terminal of said differential amplifier stage; and means to derive an output signal from said differential amplifier stage, characterized in that said load resistors have different resistance values to establish a point at which the polarity of the differential output from said differential amplifier stage reverses.

2. A burst level detector as claimed in claim 1, wherein said load resistors are connected in series with the collector electrodes of the respective transistors and the ratio of the resistance values of said load resistors is selected to be at least 1:1.04.

3. A burst level detector as claimed in claim 1, wherein the collector electrodes of said transistors are connected to a source terminal respectively through said load resistors, capacitors are connected respectively in parallel with said load resistors, output terminals are connected to said collector electrodes, the emitter electrodes of said transistors are connected to a source of constant current, the base electrodes of said transistors are connected to a source of DC bias voltage, and a burst signal to be detected is superposed upon the DC bias voltage impressed upon the base electrode of one of the transistors.

4. A burst level detector comprising:

a first pair of transistors;

a second pair of transistors;

a third pair of transistors;

a first parallel circuit including a first load resistor and a first capacitor connected between the collector electrodes of the corresponding transistors of said first and second pairs and a source of direct current;

a second parallel circuit including a second load resistor and a second capacitor connected between the collector electrodes of the other corresponding transistors of said first and second pairs and said source of direct current;

said first and second load resistors having different resistance values;

output terminals connected respectively to the junctions between said first and second parallel circuits and said collector electrodes;

means to impress a D.C. voltage upon the base electrodes of one of the transistors of said first and second pairs;

means to impress a reference signal upon the base electrodes of the other of the transistors of said first and second pairs;

means to connect the emitter electrodes of the transistors of said first pair to the collector electrode of one transistor of said third pair;

means to connect the emitter electrodes of the transistors of said second pair to the collector electrode of the other transistor of said third pair;

means to impress a DC bias voltage upon the base electrode of said other transistor of said third pair;

means to impress a DC bias voltage and a burst signal superposed thereon upon the base electrode of said one transistor of said third pair; and a source of constant current connected to the emitter electrodes of the transistors of said third pair, the transistors of said first, second and third pairs constituting a full balance type differential amplifier stage.

5. A phase detector for use in a color television receiver, comprising:

a balanced type differential amplifier stage including a pair of transistors and having an input terminal connected to one of said transistors;

a pair of load resistors respectively connected to said transistors;

means to impress a horizontal synchronizing pulse upon the input terminal of said differential amplifier stage;

means for supplying an output signal from said differential amplifier stage; and a series circuit connected between said pair of load resistors, said series circuit including a resistor and a capacitor, characterized in that said load resistors have different resistance values to establish a point at which the polarity of the differential output from said differential amplifier stage reverses.

6. A phase detector according to claim 5, wherein said load resistors are connected in series with the collector electrodes of respective transistors and the ratio of the resistance values of said load resistors is selected to be at least 1:1.04.

7. A phase detector for use in a color television receiver comprising:

a differential amplifier stage including a pair of amplifier elements;

a source of constant current connected to corresponding electrodes of said amplifier elements;

a first source of bias voltage;

first diode means connected between the output terminal of said differential amplifier stage and said first source of bias voltage for setting the upper limit of the output voltage of said differential amplifier stage;

a second source of bias voltage;

second diode means connected between the output terminal of said differential amplifier stage and said second source of bias voltage for setting the lower limit of the output voltage of said differential amplifier stage;

means for controlling the operation of said source of constant current in accordance with a burst pulse and a signal selected from the group consisting of a chromaticity signal and the AC component of a local color sub-carrier wave signal, for causing said source of constant current to operate only during a predetermined period; and means for applying to said differential amplifier stage an input signal selected from the group consisting of said local color sub-carrier wave signal and said chromaticity signal, thereby producing at the output terminal of said differential amplifier stage an output signal corresponding to the phase difference between said burst signal and said local color sub-carrier wave signal.

8. A phase detector according to claim 7, wherein:

said amplifier elements comprise first and second transistors, and said source of constant current comprises a third transistor, the collector electrodes of said first and second transistors being connected to a DC source respectively through load resistors;

a series circuit including a resistor and a capacitor is connected across said collector electrode;

said first diode means comprises a first pair of diodes serially connected across said collector electrodes, said first source of bias voltage being connected to the junction of said first pair of diodes;

said second diode means comprises a second pair of diodes serially connected across said collector electrodes, said second source of bias voltage being connected to the junction of said second pair of diodes; and the emitter electrodes of said first and second transistors being connected to the collector electrode of said third transistor.

9. A phase detector for use in a color television receiver comprising:

a first differential amplifier stage including a first pair of amplifier elements;

a source of constant current connected to corresponding electrodes of said amplifier elements;

a second differential amplifier stage including a second pair of amplifier elements with their corresponding electrodes connected to the output electrode of at least one of the amplifier elements of said first pair;

a first source of bias voltage;

first diode means connected between the output terminal of said second differential amplifier stage and said first source of bias voltage for setting the upper limit of the output voltage of said second differential amplifier stage;

a second source of bias voltage;

second diode means connected between the output terminal of said second differential amplifier stage and said second source of bias voltage for setting the lower limit of said second differential amplifier stage;

means for operating said source of constant current in accordance with a burst pulse;

means for applying to said first differential amplifier stage an input signal selected from the group consisting of a chromacity signal and a local color sub-carrier wave signal; and means for applying to said second differential amplifier stage an input signal selected from the group consisting of said local color sub-carrier wave signal and said chromaticity signal, thereby producing at the output terminal of said second differential amplifier stage an output signal corresponding to the phase difference between said birst signal and said local color sub-carrier wave signal.

10. A phase detector according to claim 9, wherein:

said first pair of amplifier elements comprises first and second transistors;

said source of constant current comprises a third transistor;

said second pair of amplifier elements comprises fourth and fifth transistors, the collector electrodes of said fourth and fifth transistors being connected to a DC source respectively through load resistors;

a series circuit including a resistor and a capacitor is connected across said collector electrodes;

said first diode means comprises a first pair of diodes serially connected across said collector electrodes;

said first source of bias voltage is connected to the junction of said first pair of diodes;

said second diode means comprises a second pair of diodes serially connected across said collector electrodes; said second source of bias voltage is connected to the junction of said second pair of diodes;

the emitter electrodes of said fourth and fifth transistors are connected to the collector electrodes of said first and second transistors; and the emitter electrodes of said first and second transistors are connected to the collector electrode of said third transistor.

11. A phase detector according to claim 9, wherein a burst signal is impressed upon the input of said first differential amplifier stage.

12. A phase detector according to claim 9, wherein a burst signal is impressed upon the input of said second differential amplifier stage.

13. A detector circuit for use in a color television receiver, comprising:

a differential transistor amplifier stage having a pair of input terminals, one of which receives a color burst signal and both of which receive a bias voltage, and a pair of output terminals;

a pair of load resistors coupled between said pair of output terminals and a source of reference potential; and means for coupling said output terminals of said differential amplifier stage to said load resistors;

wherein the ratio between the values of said load resistors is at least 1:1.04.

14. A detector circuit according to claim 13, wherein said means for coupling the output terminals of said differential amplifier stage to said load resistors comprises a pair of conductor wires.

15. A detector circuit according to claim 13, wherein said means for coupling the output terminals of said differential amplifier stage to said load resistors comprises first and second differential amplifier pairs, each comprising first and second transistors, the first transistor of each first and second differential amplifier pair coupling said first output terminal to the first of said pair of load resistors and a second transistor of each differential amplifier pair coupling said second output terminal to the second load resistor.

16. A detector circuit according to claim 13, further including a series circuit of a resistor and a capacitor connected between said output terminal.

17. A detector circuit according to claim 16, further including first and second pairs of inversely connected diodes the polarities of each pair of diodes being opposite to one another, connected between said output terminals, and having a common junction of each pair of diodes connected to said first and second sources of bias voltage.

18. A detector circuit according to claim 13, further including a constant current source connected to supply a constant current to said differential amplifier stage.

* * * * *